Patented Feb. 14, 1950

2,497,131

UNITED STATES PATENT OFFICE 2,497,131

MANUFACTURE OF SULFOARYL-AMIDES OF AROMATIC CARBOXYLIC ACIDS

Herbert August Lubs, Wilmington, Del., and Walter Valentine Wirth, Woodstown, J. Allington Bridgman, Salem, and Louis Spiegler, Woodbury, N. J., assignors to E. I. du Pont de Nemours & Company, Wilmington, Del., a corporation of Delaware No Drawing. Application June 29, 1948, Serial No. 35,986

5 Claims. (Cl. 260—507)

This invention relates to the preparation of sulfoaryl-amides of aromatic carboxylic acids, and more particularly it deals with a novel and improved method of preparing these directly from the corresponding sulfoaryl-amine and aromatic carboxylic acid.

It is an object of this invention to provide a practical method for the preparation of sulfoaryl-amides of aromatic carboxylic acids, that is, compounds which may also be designated as aroyl-amino-derivatives of aromatic sulfonic acids. Other and further important objects of this invention will appear as the description proceeds.

It has been known that aroyl derivatives of aromatic amines may be prepared by condensing the corresponding aromatic carbonyl chloride and aromatic amine in an aqueous medium in the presence of an alkaline agent such as sodium hydroxide, sodium carbonate and calcium carbonate. This method, however, possesses two essential drawbacks. In the first place, the process requires preliminary preparation and isolation of the carbonyl chloride from the corresponding carboxylic acid by the aid of an acid halogenating agent, for instance phosphorus pentachloride, according to the following scheme:

$$R—COOH+PCl_5 \rightarrow RCOCl+POCl_3+HCl$$

In the second place, the above method is workable only with such carbonyl chlorides as do not hydrolyze readily to give back the corresponding free carboxylic acid, or in such cases where the hydrolysis rate of the carbonyl chloride is much slower than its reaction rate with the particular arylamine employed. Once the free carboxylic acid has been formed, condensation with the arylamine under the specified conditions no longer proceeds. The condensation of paratoluyl chloride or para-anisoyl chloride wth diaminodisulfostilbene may be cited as examples of such unworkable cases.

It has also been known, that aromatic amines which are free of sulfonic acid groups may be condensed directly with aromatic carboxylic acids by adding to the mixture of the two a special dehydrating agent, such as phosphorus trichloride, phosphorus oxychloride or thionyl chloride, in the presence of an inert solvent. These agents are known to have the property of converting carboxylic acids into their acid chlorides, and are often referred to as acid-halogenating agents. This method has been applied particularly to the condensation of aryl amines, free of $SO_3H$ groups with 2:3-hydroxy-naphthoic acid or other aromatic orthohydroxy-carboxylic acids, using toluene, xylene, kerosene, etc. as inert solvent. Attempts, however, to apply these processes to aromatic amines having nuclear sulfonic acid groups, with the object of producing the corresponding aroyl-amino-aryl-sulfonic acids resulted in failure. Whether this failure is due to the poor solubility of arylamine-sulfonic acids in the solvents mentioned, or perhaps, on the contrary, to the excessive reactivity of the sulfonic acid group and its preferential condensation with the acid chlorinating agent to form $SO_2Cl$ groups, is not very clear to us at the moment. But in any event, our attempt to condense, for instance, toluic acid with 4,4′-diamino-stilbene-2,2′-disulfonic acid by feeding in phosphorus trichloride into a hot mixture of the two in toluene, did not give the desired condensation product, that is 4,4′-bis-(p-toluyl amido)-stilbene-2,2′-disulfonic acid.

We have now found that the condensation of an aromatic-amino-sulfonic acid with in aromatic carboxylic acid can be successfully achieved if the above process is modified to the extent of having a tertiary base present in the reaction mass in sufficient quantity to neutralize the sulfonic acid groups of the amine compound and to absorb any acid liberated in the operation. Alternatively, one may start initially with a salt of the sulfonic acid, for instance, the sodium sulfonate, in which event it is sufficient to have enough tertiary base present to neutralize the liberated acid. Inasmuch as the condensation may be formulated by the following equation:

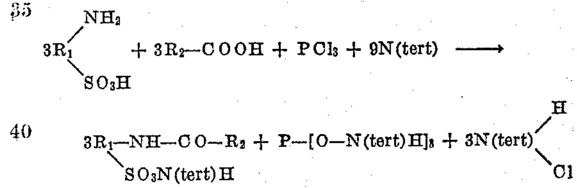

the above statements concerning the quantity of tertiary base may be summarized by the rule that there be present at least two moles of tertiary base for each $NH_2$ radical and at least one mole of the tertiary base for each free $SO_3H$ radical in the aryl-amino-sulfonic acid employed.

If the sulfo groups are initially in the form of sodium salt, it is sufficient to employ the tertiary base in quantity corresponding to 2 moles for each $NH_2$ group present. Again, one may start initially with the tertiary base salts of both the sulfo compound and the carboxy compound, in which event it is sufficient to add one mole of the tertiary base for each amino group present.

All the above tends to the hypothesis that the condition for success of the condensation is that all the said groups shall have first been neutralized. Yet, this result is exceedingly surprising, inasmuch as it is known that aromatic sulfonates of the form R—$SO_3Na$ (in other words, compounds wherein the sulfo group is in the form of sodium salt) are very reactive toward acid-chlorinating agents, forming the corresponding sulfonyl chloride compound, R—$SO_2Cl$.

Were such $SO_2Cl$ groups to form in our process, they would readily condense with the $NH_2$ groups of the same molecules or of neighboring molecules, forming sulfonamides, which would be water-insoluble. The good solubility of our reaction products and other properties thereof point to the absence of such detrimental side reactions.

Although the aforegoing discussion indicates the theoretical quantities of tertiary base required under various circumstances, variations are nevertheless permissible, and the quantity of tertiary base may vary from 80% to 150% of the above indicated theoretical quantities.

To provide a sufficiently fluid reaction medium, the reaction mass should preferably contain further an inert, organic liquid. The choice of inert liquid depends ultimately on the ease or economy with which it may be recovered. From this viewpoint, a water-insoluble organic diluent is desired, so that it may be separated eventually by distillation with steam. If the tertiary base is also water-insoluble, it too can be recovered in this manner. It is merely necessary to treat the reaction mass during this stage with aqueous alkali, to set free again any of the tertiary base which may have been bound to HCl or to the $SO_3H$ groups. Steam distillation thus separates both the inert liquid and the tertiary base, in the form of an oily phase, from the desired reaction product, which is partially dissolved and partially suspended in the aqueous phase.

If desired, the alkali treatment may be introduced at such a stage as to effect further separation between the inert liquid and the tertiary base. For instance, the steam distillation may be started before addition of any alkali, and continued until all the inert solvent has distilled over. Aqueous alkali is then added gradually to liberate any acid-bound tertiary base, and distillation is continued until all the tertiary base has been liberated and distilled. The aqueous residue in the still then contains the bulk of the reaction product.

To insure good volatility with steam, it is desirable to select as inert reaction medium a water-insoluble organic liquid which boils at a temperature between 75° and 220° C. Benzene, toluene, xylene, chlorobenzene, tetralin and Stoddard solvent (a petroleum fraction) are illustrations of suitable organic liquid.

The tertiary amine should likewise boil between 50° and 225° C., and, as already indicated, should preferably be water-immiscible. Extreme insolubility with water, however, is not required of the tertiary base. It is sufficient if the tertiary base is so much more poorly soluble in water than in the inert liquid employed as to be dissolved mostly by the latter. A distribution coefficient of not greater than 0.1 can be laid down as a general rule (that is, $S_W:S_L=1:10$ or less than 1:10, $S_W$ being the quantity dissolved in water, while $S_L$ is the quantity dissolved in the organic liquid). In such a case, the organic layer of the distillate contains the bulk of the inert, organic liquid and the bulk of the tertiary amine, and may be re-used directly or after suitable enrichment, in a subsequent operation of the same nature.

The tertiary base presumably reacts first with any free sulfonic acid groups present to form a salt thereof. From this viewpoint, it is recommended to select a tertiary base which is strong enough to react with sulfonic acid groups. To express the same idea in different words, the tertiary base should preferably be one which has in water a pH-value of 10 to 14. Dimethyl-cyclohexylamine, diethyl-cyclohexylamine, tri-butylamine and quinoline may be mentioned as illustrations of suitable tertiary bases. If recovery of the base is of no moment, pyridine is equally serviceable.

The reaction is preferably carried out at a temperature between 100° and 150° C. Where the inert liquid or tertiary base boils below the desired reaction temperature, the reaction is carried out in a closed vessel. Where the chosen combination of liquid and base boils just within the above range, the reaction may be carried out at the reflux temperature of the reaction mass. Toluene, commercial xylene, and monochlorobenzene are very convenient choices from the latter viewpoint.

The dehydrating or acid halogenating agent may be selected from agents which are known as capable of converting a carboxylic acid into the corresponding carbonyl chloride, for instance thionyl chloride, phosphorus oxychloride or phosphorus trichloride. Whether their action in the instant invention is primarily by way of water-removal or by preliminary conversion of the carboxy acid into a carbonyl chloride is purely a matter of conjecture, and does not affect the actual operation of this invention.

Our process is of particular value when applied to the condensation of diamino-disulfostilbenes with benzoic acid or nuclear substitution derivatives thereof, such as p-toluic acid, p-anisic acid, 3,4-dimethoxy-benzoic acid, etc., in view of the commercial interest of the resulting products and in view of their apparent inability of being prepared by the aforementioned older methods.

In general outline, our preferred mode of procedure is substantially as follows: The dry amino-arylsulfonic acid, for instance 4,4'-diamino-stilbene-2,2'-disulfonic acid, and the chosen carboxylic acid, for instance toluic or anisic, are suspended in an inert solvent such as toluene, and sufficient pyridine or diethylcyclohexylamine is added to form the tertiary nitrogen base salt of the sulfonic acid and to form tertiary base salts from the acids liberated as the amide is produced. A small amount of solvent is preferably distilled off at the beginning, to remove traces of water. The acid halogenating agent, for instance phosphorus oxychloride, is then added, preferably dropping the temperature of the reaction mass to the lower limit of the aformentioned preferred range (i. e. to about 100° C.) during the addition. The reaction mass is then heated for a few hours to complete the reaction, as shown by testing a sample for free $NH_2$. Water is then added, and the mass is steam distilled while gradually adding to it aqueous alkali (NaOH, KOH, etc.) to set free the acid-bound nitrogenous base. The inert, organic liquid and tertiary base collect in the oily phase of the distillate and are drawn off for re-use. The residual aqueous mass is cooled and the dialkali-sulfonate of the diaroyl-diamido-stilbene is recovered.

The recovered salt may be acidified to give the free diaroyl-diamido-stilbene-disulfonic acid, and from the latter, by reaction with suitable bases, any desirable salt of the sulfonate may be formed, for instance the potassuim, calcium, ammonium or pyridinium salts.

Without limiting this invention, the following examples will illustrate our preferred mode of operation. Parts mentioned are by weight:

*Example 1*

Distil a mixture of 46.2 parts of 4,4'-diamino-stilbene-2,2'-disulfonic acid, 45.2 parts of p-nitro benzoic acid, 140 parts diethyl-cyclohexylamine and 610 parts of monochloro-benzene, taking off approximately 165 parts of distillate to remove traces of water. Cool the charge to 100° C. and add gradually 22 parts of phosphorus oxychloride and heat at reflux for 2 hours. Cool the charge, add 500 parts of water and distil at constant volume, with gradual addition of sufficient sodium hydroxide to release the diethyl-cyclohexylamine from its salts. Practically all of the monochloro-benzene and of the diethyl-cyclohexylamine separate in the oil layer of the distillates. Cool the residual aqueous charge, filter, wash the product with cold water and dry. The product is sodium 4,4'-bis-(p-nitrobenzoyl-amino)-stilbene-2,2'-disulfonate of a high degree of purity.

The phosphorus oxychloride in the above example may be replaced by an equivalent quantity of phosphorus trichloride, with essentially the same results.

*Example 2*

Distil a mixture of 46.2 parts of 4,4'-diamino-stilbene-2,2'-disulfonic acid, 41.8 parts of p-anisic acid, 105 parts of diethyl-cyclohexylamine, 390 parts of xylene and 87 parts of toluene, taking off approximately 130 parts of distillate in order to remove traces of water. Cool to 100° C., add 31 parts of thionyl chloride and reflux for 2½ hours. Make three successive additions of 3 parts each of thionyl chloride and reflux 1 hour between additions. After the third addition, reflux for 3 hours then add 3 parts more of thionyl chloride and reflux for 2 hours. Cool, add 500 parts of water and distil with gradual addition of sodium hydroxide as in Example 1. Cool the aqueous still residue, filter, and wash the press cake with 5% of brine until free from primary amine. The product is sodium-4,4'-bis-(p-methoxy - benzoylamino) - stilbene - 2,2' - disulfonate.

*Example 3*

Distil a mixture of 46.2 parts of 4,4'-diamino-stilbene-2,2'-disulfonic acid, 41.8 parts of p-anisic acid, 20 parts of pyridine, 390 parts of xylene and 87 parts of toluene taking off approximately 130 parts distillate in order to remove traces of water. Cool to 90° C. and add 63 parts of dry pyridine followed by 24 parts of phosphorus oxychloride and reflux until reaction is complete. Cool below 80° C., add 500 parts of water and distil with the addition of sodium hydroxide solution to release the pyridine from its salts. Most of the toluene and xylene and a part of the pyridine are recovered in the oil layer of the distillates. Cool the aqueous residue, filter off the product, wash with brine and dry. The product is the same as in Example 2.

*Example 4*

Distil a mixture of 46.2 parts of 4,4'-diamino-stilbene-2,2'-disulfonic acid, 41.8 parts of p-anisic acid, 150 parts of diethyl-cyclohexylamine and 475 parts of xylene taking off approximately 130 parts of distillate to remove traces of water. Cool to 100° C. and add 26 parts of phosphorus oxychloride and reflux until reaction is complete. Cool, add 500 parts of water and distil with addition of sufficient sodium hydroxide solution to release the diethyl-cyclohexylamine from its salts. Practically all of the xylene and diethyl-cyclohexylamine are contained in the oil layer of the distillates and are removed. Cool the aqueous residue, filter the product, wash with brine and dry. The product is the same as in Example 2.

*Example 5*

Distil a mixture of 72 parts of 4,4'-diamino-stilbene-2,2'-disulfonic acid, 68.5 parts of p-anisic acid, 139.5 parts of diethyl-cyclohexylamine and 1040 parts of toluene, taking off approximately 520 parts of distillate to remove traces of water. This distillate contains from 0.10 to 0.21% of diethyl-cyclohexylamine. Cool the charge to 100° C. and add simultaneously and slowly, from separate feed lines, 15.5 parts of diethyl-cyclohexylamine and 41 parts of phosphorus trichloride while raising the temperature to reflux. Reflux for 8 hours, then cool and add 500 parts of water, preferably containing a small quantity of sodium carbonate. Distil at constant volume by separating the water layer and returning it to the charge continuously until the toluene has been removed from the charge. 455 parts of distillate are obtained containing from 0 to a few per cent of diethyl-cyclohexylamine, depending on the quantity of sodium carbonate added.

Continue the distillation while adding slowly, over 4 hours, 124 parts of 40% sodium hydroxide solution. 112 parts of diethyl-cyclohexylamine of 96–99% purity is recovered in the distillate.

Add 60 parts of common salt to the remaining aqueous charge and cool to room temperature. Filter, wash the product with 10% brine and dry. The product is the same as in Example 2 and of the same high quality.

From these examples it can be seen that the procedures embodied in this invention are capable of considerable variation in conditions such as the choice of solvent, choice of tertiary base or molal ratios of reactants selected. For instance, if the acid halogenating agent is employed in larger than stoichiometric quantity, a corresponding increase in the quantity of tertiary base is required to maintain the reaction mass neutral. The tertiary base may be added at different stages and in a series of steps. For instance, the tertiary base may be added at first in quantity just sufficient to form the salt of any free $SO_3H$ group present in the reaction mass and of the carboxy compound employed; additional quantities may then be fed in simultaneously with the addition of the acid chlorinating agent in portions sufficient to neutralize any acidity developed during such addition.

Although a water-insoluble tertiary amine is preferred to facilitate recovery, a water-soluble tertiary base, such as pyridine, may also be employed where the economics of the particular process under consideration make such recovery of the base of no special consequence.

Since the condensation is carried out in a non-aqueous medium which may be kept alkaline throughout the progress of the condensation by the use of a small excess of tertiary nitrogen base, it is not necessary to effect the condensation in glass lined equipment. Stainless steel can be used to advantage since there is negligible corrosion.

The aromatic carboxylic acids may be ring-substituted with groups which are not reactive, that is, groups which undergo no change when heated with the reactants under the condtions employed.

The amino aromatic sulfonic acids may likewise be ring-substituted with inactive groups as mentioned above. The tertiary nitrogen base may be selected depending on economic and operating conditions which show the greatest advantage. If the amino-aryl-sulfonic acid is considerably cheaper than the carboxylic acid, it may be used in excess over the stoichiometric quantity where it can be easily separated from the product.

Other permissible variations in details will be readily apparent to those skilled in the art.

For the purpose of the claims below, the terms "water-insoluble" or "water-immiscible," when applied to an organic liquid, shall be construed as meaning a solubility in water not exceeding 1% by weight at room temperature.

We claim as our invention:

1. In the process of producing a diaroyl-diamino-stilbene-disulfonate, the step which consists of bringing together into reactive contact a 4,4'-diamino-2,2'-disulfo-stilbene, a monocyclic aromatic carboxylic acid, and an acid halogenating agent selected from the group consisting of phosphorus oxychloride, phosphorus trichloride and thionyl chloride, in the presence of a tertiary base selected from the group consisting of dimethyl-cyclohexylamine, diethyl-cyclohexylamine, tributylamine, quinoline and pyridine.

2. The process of producing a diaroyl-diamino-stilbene-disulfonic acid, which comprises adding an acid halogenating agent selected from the group consisting of phosphorus oxychloride, phosphorus trichloride and thionyl chloride into a mixture of a 4,4'-diamino-2,2'-disulfo-stilbene, a monocyclic aromatic carboxylic acid, and diethyl-cyclohexylamine, heating the reaction mass to a temperature between 100 and 150° C., and recovering the condensation product.

3. A process as in claim 2, the reaction mass containing further an inert, organic diluent which boils at a temperature between 75° and 220° C.

4. The process of condensing 4,4-diamino-stilbene-2,2'-disulfonic acid with p-anisic acid, which comprises feeding phosphorus oxychloride into a mixture of said two compounds maintained at reflux temperature in an organic liquid hydrocarbon which boils at a temperature between 100° and 150° C., said mixture containing further diethyl-cyclohexylamine in quantity corresponding to at least 6 moles of the same per mole of said diamino-stilbene compound, then adding water to the reaction mass and distilling the same with addition of sufficient sodium hydroxide to release any acid-bound diethyl-cyclohexylamine formed during the reaction, separating the oily distillate, and recovering from the residual aqueous mass the disodium salt of 4,4'-di-(p-anisoylamino)-stilbene-2,2'-disulfonic acid.

5. The process of producing the amide of p-anisic acid and 4,4'-diamino-2,2'-disulfo-stilbene, which comprises forming a mixture of the diethyl-cyclohexyl-ammonium salts of p-anisic acid and of 4,4'-diamino-stilbene-2,2'-disulfonic acid in an organic hydrocarbon which boils at a temperature between 100° and 150° C., heating said mixture to reflux and passing into it simultaneously phosphorus trichloride and diethyl-cyclohexylamine, continuing the heating until the reaction is complete, then adding water to the reaction mass and distilling the same to remove the organic hydrocarbon, adding an aqueous solution of sodium hydroxide and continuing the distillation to remove diethyl-cyclohexylamine, and recovering disodium-bis-(p-anisoylamino)-stilbene-2,2'-disulfonate from the aqueous residue.

HERBERT AUGUST LUBS.
WALTER VALENTINE WIRTH.
J. ALLINGTON BRIDGMAN.
LOUIS SPIEGLER.

REFERENCES CITED

The following references are of record in the file of this patent:

UNITED STATES PATENTS

| Number | Name | Date |
|---|---|---|
| 1,857,555 | Laska et al. | May 10, 1932 |
| 1,874,581 | Neelmeier et al. | Aug. 30, 1932 |
| 1,927,936 | Hentrich et al. | Sept. 26, 1933 |
| 1,932,180 | Guenther et al. | Oct. 24, 1933 |
| 2,299,834 | Martin et al. | Oct. 27, 1942 |
| 2,468,431 | Eberhart et al. | Apr. 26, 1949 |

FOREIGN PATENTS

| Number | Country | Date |
|---|---|---|
| 442,530 | Great Britain | 1936 |
| 584,484 | Great Britain | 1947 |

Certificate of Correction

Patent No. 2,497,131 February 14, 1950

HERBERT AUGUST LUBS ET AL.

It is hereby certified that errors appear in the printed specification of the above numbered patent requiring correction as follows:

Column 2, line 22, for the words "with in" read *with an*; column 7, line 53, for "4,4-diamino-" read *4,4'-diamino-*;

and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*